United States Patent [19]
Mononen

[11] Patent Number: 5,846,015
[45] Date of Patent: Dec. 8, 1998

[54] UNIVERSAL COUPLING

[75] Inventor: Helge Mononen, Richmond, Canada

[73] Assignee: Measurex Devron Inc., British Columbia, Canada

[21] Appl. No.: 662,358

[22] Filed: Jun. 12, 1996

[51] Int. Cl.$^6$ .................................................... F16C 11/06
[52] U.S. Cl. ................................. 403/90; 403/56; 403/83; 403/110; 403/141; 118/119
[58] Field of Search ................. 403/56, 76, 77, 403/90, 114, 122, 141, 142, 143; 118/119

[56] References Cited

U.S. PATENT DOCUMENTS

| | | | |
|---|---|---|---|
| 933,499 | 9/1909 | Taylor | 403/141 X |
| 1,455,441 | 5/1923 | Hodny | 403/141 X |
| 1,929,807 | 10/1933 | Casper | 403/56 X |
| 3,124,971 | 3/1964 | Peters et al. | 403/56 X |
| 4,142,816 | 3/1979 | Kramer | 403/143 X |
| 4,225,258 | 9/1980 | Thompson | 403/141 X |
| 4,245,582 | 1/1981 | Azheid et al. | 118/119 |
| 4,704,043 | 11/1987 | Hackman et al. | 403/143 X |
| 4,833,941 | 5/1989 | S. I. Leppanen et al. | 74/625 |
| 4,974,986 | 12/1990 | Cook | 403/141 X |
| 5,419,522 | 5/1995 | Luecke et al. | 403/56 X |

*Primary Examiner*—Blair M. Johnson
*Assistant Examiner*—Bruce A. Lev
*Attorney, Agent, or Firm*—Christie, Parker & Hale, LLP

[57] ABSTRACT

A coupling member for joining a first article to a second omprising first and second elongate arms that are pivotally connectable to a main housing via ball and socket joints. Each arm has one end formed for connection to one of the articles and the other end adapted to be engaged in the ball and socket joint. A locking system is also provided to lock the arms in position with respect to the main housing after the arms have been connected between the first and second articles to create a rigid connection between the first and second articles. The pivotable nature of the coupling member allows for a connection to be made between the first and second articles to be joined without the articles being in perfect alignment whereupon the locking system is applied to create a rigid link.

13 Claims, 2 Drawing Sheets

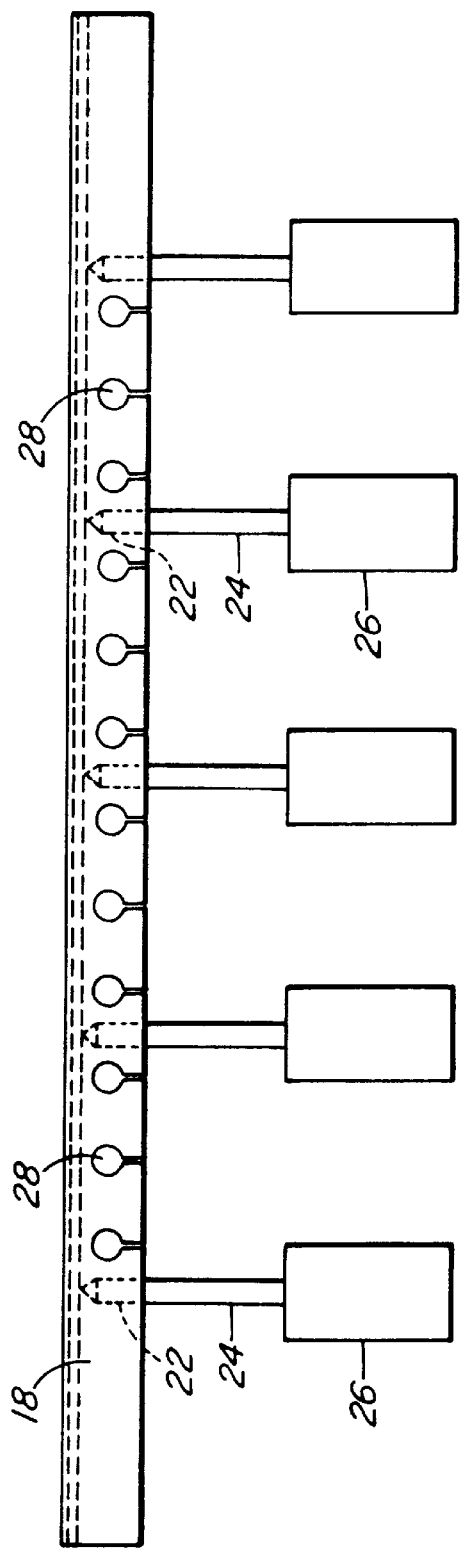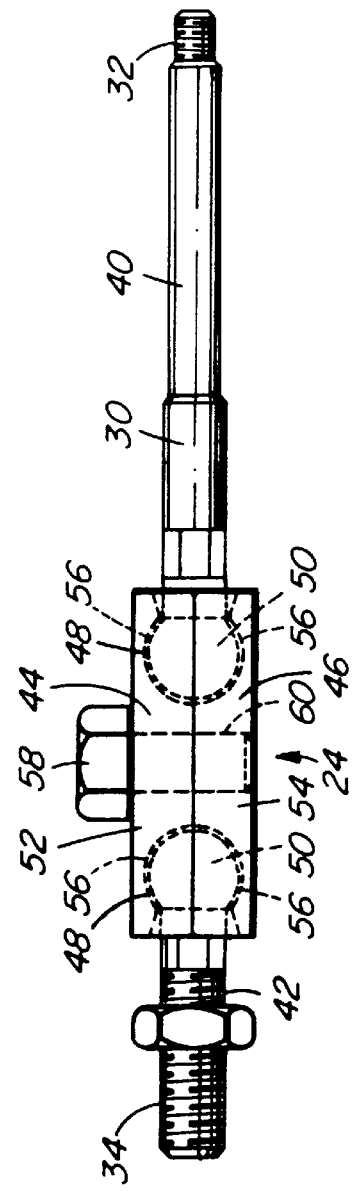

UNIVERSAL COUPLING

FIELD OF THE INVENTION

This invention relates to a coupler for connecting together an actuator and a device controlled by the actuator. More particularly, the coupler is useful in papermaking with coat weight control equipment.

BACKGROUND OF THE INVENTION

One of the steps involved in manufacture of paper sheets on a paper machine is the application of a coating material to the sheet surface. During the coating step, there is a need to control the weight of coating material applied to the sheet surface in both the machine direction (MD) and the cross machine direction (CD). Coat weight control in the cross machine direction requires the adjustment of force on a coating blade or a coating rod that engages with the sheet surface to adjust the volume of coating applied to the sheet surface. Precise coating application is necessary across the width (cross direction) of a paper sheet and thus it is necessary to be able to control and vary coat weight in this direction by allowing for adjustment of the positioning force on the blade and hence the position of the blade across the paper sheet. This is done by using a plurality of actuators extending in the cross direction along the length of the coating blade. The actuators press a backing bar up against the blade and the paper sheet passes between the blade and a backing rolls such that variation of the force applied to the coating blade affects the coat weight across the width of the sheet. Sensors downstream of the actuators measure the variation in the coat weight in the cross machine direction and provide feedback to the actuators to ensure an even coating.

It is normal practice to use a solid backing bar to permit a smoothly varying force to be applied to the coating blade in the cross direction. In some cases, an air filled pressurized flexible tube is positioned between the backing bar and the coating blade. The backing bar must have sufficient rigidity to resist the dynamic forces exerted by the coating material between the blade and the paper sheet, and yet be sufficiently flexible to allow for adequate movement by the actuators to be able to vary the coat weight. In addition, the backing bar must be substantial enough to allow attachment of actuators via coupling members in a robust manner without risk of detachment from the backing bar.

A solid bar requires high forces to cause the required deflection for cross directional coat weight control. One approach taken to solve this problem is the use of a segmented backing bar where each segment is attached to an adjustment point so the segments are independent of each other. However, this approach causes certain problems, for example, it is difficult to maintain a clearance between the segments and the segments tend to jam together. Furthermore, it is difficult to get a smooth deflection and force profile applied to the coating blade in a cross directional sense over a number of adjacent actuator attachment points.

A flexible bar is needed to provide a system that can be bent easily with low force actuators and still provide a smoothly changing pressure applied between actuators without the problems inherent in the segmented bar approach. Applicant's co-pending U.S. patent application Ser. No. 08/272,018 filed Jul. 8, 1994 discloses such a flexible bar system.

No matter the design of the backing bar, current designs generally rely on careful alignment between the actuators and connection locations on the backing bar adapted to accept a coupling member. Existing coupling members are essentially rigid rods that extend between each actuator and its associated connection point on the backing bar. The positioning of each actuator with respect to the backing bar during manufacture or maintenance of a coating machine is a slow, time consuming, and, therefore, expensive process in order to ensure proper alignment of the components.

SUMMARY OF THE INVENTION

In order to reduce manufacturing and maintenance costs, applicant has developed a unique coupling member that avoids the need for virtually perfect alignment between the actuators and the connection points of the backing bar. This is achieved by forming the coupling member with a ball and socket joint assembly intermediate the ends of the rigid connecting rod to accommodate misalignment of actuator and the backing bar. The ball and socket joint assembly can be locked to create a rigid link.

Accordingly, the present invention provides a coupling member for joining a first article to a second article comprising:

first and second elongate arms, each having one end adapted for attachment to one of the first and second articles;

a main housing for joining the other ends of the first and second arms;

pivotal joint means for pivotally connecting each of the arms to the main housing; and locking means to lock the arms in position with respect to the main housing to create a rigid connecting link between the first and second articles.

In further aspect, the present invention provides a coupling member for joining a first article to a second article comprising:

an elongate arm having ends adapted for connection to each article;

a joint assembly intermediate the ends of the arm that divides the arm into first and second portions and permits independent pivotal movement of each portion; and locking means to lock the arm portions into position with respect to the joint assembly after the portions have been connected between the first and second articles to create a rigid link.

BRIEF DESCRIPTION OF THE DRAWINGS

Aspects of the present invention are illustrated, merely by way of example, in the accompanying drawings in which:

FIG. 2 is a front elevational view showing in more detail the manner in which the actuators are connected to the backing bar; and FIG. 3 is a partially sectioned view showing a coupling member according to the present invention.

DESCRIPTION OF THE PREFERRED EMBODIMENTS

Figure 1:
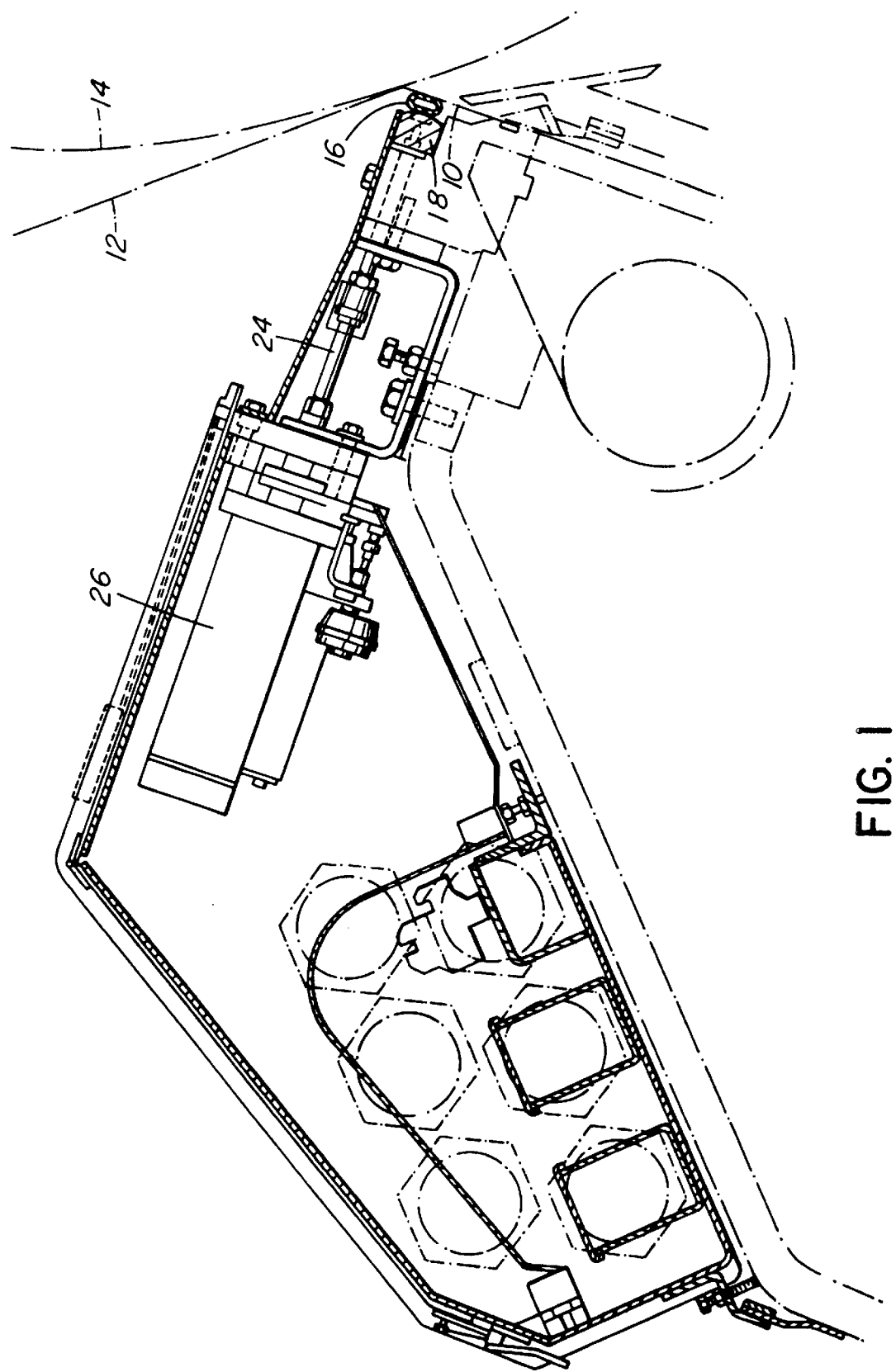
FIG. 1 is a section view through a coating machine showing a coating blade pressing against a paper sheet passing a backing roll with an actuator coupled to a flexible backing bar by a coupling member being used to control the force on the coating blade.

Referring to FIG. 1, there is shown a section view through a typical coating machine 2 that employs a coating blade 10 pressed against a sheet 12 moving on a backing roll 14. An inflatable tube 16 is positioned between the blade 10 and a flexible backing bar 18 and is kept pressurized.

Details of the flexible backing bar 18 are shown in FIG. 2. A linear groove 20 is provided in the bar to support the tube 16 and ensure that it is retained between the blade 10 and the backing bar 18. Connection points 22 which are in the form of tapped holes are positioned at the back of the backing bar 18. Coupling members 24 are received in the tapped holes and extend to actuators 26. The actuators 26 are supported on brackets 28 which in turn also guide any movement of coupling members 24.

Each of the actuators 26 is a low force actuator providing up to 600 lbs. force and consists of a single harmonic gear. An example of such an actuator is disclosed in U.S. Pat. No. 4,833,941. When an actuator 26 is operated, coupling member 24 is moved toward or away from backing bar 18 resulting in local deformation of the backing bar with a resulting change in the force applied to the coating blade leading to a change in the thickness of the paper coating.

As shown in FIG. 2, the connection points 22 are evenly spaced apart along the length of the bar 18 and between the connections points 22 are formed keyhole slots 28 which permit bending and flexing of the bar under the control of actuators 26.

FIG. 3 is a detail view of a preferred embodiment of a coupling member 24 according to the present invention. Coupling member 24 comprises an elongate arm 30 having a first threaded end 32 adapted for connection to backing bar 18 at a connection point 22 and a second threaded end 34 adapted for connection to actuator 26.

Arm 30 is divided into two arms or portions 40 and 42 by a joint assembly 44 intermediate the ends of arm 30 that is designed to permit independent pivotal movement of each arm portion.

In the preferred embodiment, joint assembly 44 comprises a pair of ball and socket joints formed from a main housing 46 having cavities 48 at each end to define sockets adapted to receive a ball 50 formed at the end of each arm portion 40 and 42.

Preferably, main housing 46 comprises a clamp member having upper and lower portions 52 and 54, respectively, formed with alignable hemispherical cavities 56 that cooperate to define the sockets.

Upper and lower clamp portions 52 and 54 are connected together by a fastener comprising a threaded bolt 58 that engages in a threaded passage 60 extending through the two clamp portions. This arrangement provides the locking means of the present invention to fix the position of arm portions 40 and 42 with respect to the joint assembly. Tightening of bolt 58 draws together the upper and lower clamp portions to grip balls 50 of the arm portions in sockets 48 to prevent further rotary movement of the arms.

By locking the arm portions into position with respect to joint assembly 44 after arm portions 40 and 42 have been connected between actuator 26 and backing bar 18, a rigid link is created between the actuator and the bar backing without the need for perfect alignment between these components.

It will be appreciated by a person skilled in the art that, while the connecting member of the present invention has been described in some detail with reference to coating machinery, the connecting member is not limited solely to such use. The connecting member of the present invention finds application whenever it is necessary to directly connect together two or more spaced components.

Although the present invention has been described in some detail by way of example for purposes of clarity and understanding, it will be apparent that certain changes and modifications may be practised within the scope of the appended claims.

I claim:

1. In a coating machine having a coating blade for applying a coating to a surface an elongate, flexible backing bar to support the coating blade and a plurality of actuators for applying distorting forces along the length of the backing bar, the improvement comprising:

a plurality of coupling members for joining the backing bar to the actuators, each coupling member comprising:
first and second elongate arms, each having first and second ends, the first end of the first arm being adapted for attachment to the backing bar and the first end of the second arm being adapted for attachment to one of the plurality of actuators;
a rigid main housing for joining the second ends of the first and second arms;
a joint for pivotally connecting each of the arms to the main housing; and
locking means to lock the arms in position with respect to the main housing to create a rigid connecting link having a generally longitudinal axis defined by the first and second arms for transmission of forces along the longitudinal axis between the backing bar and the one of the plurality of actuators.

2. A coating machine as claimed in claim 1 in which the joint comprises a ball and socket joint.

3. A coating machine as claimed in claim 2 in which each ball and socket joint comprises a socket formed in the main housing adapted to receive a ball formed at the second end of each arm.

4. A coating machine as claimed in claim 3 in which the main housing comprises a clamp member having upper and lower portions formed with alignable hemispherical cavities that co-operate to define the sockets of the ball and socket joint.

5. A coating machine as claimed in claim 4 in which the locking means comprises a fastener connecting together the upper and lower portions of the clamp member in order to draw the portions together to grip the balls of the arms in the sockets to fix the arms with respect to the main housing.

6. A coating machine as claimed in claim 5 in which the upper and lower portions of the clamping member are formed with an alignable threaded passage and the fastener is a threaded bolt tightenable into the threaded passage.

7. In a coating machine having a coating blade for applying a coating to a surface, an elongate, flexible backing bar to support the coating blade, and a plurality of actuators for applying distorting forces along the length of the backing bar, the improvement comprising:

at least one coupling member for joining the backing bar to an actuator comprising:
a rigid main housing formed with joint means,
first and second elongate arms, each arm having two ends, one end of each arm formed for connection to a different one of the backing bar and the actuator and the other end of each arm being adapted to be engaged with the joint means to permit pivotable movement of each arm with respect to the main housing; and
locking means to lock the arms in position with respect to the main housing to create a rigid member having a generally longitudinal axis defined by the first and second arms for transmission of forces along the longitudinal axis between the backing bar and the actuator.

8. In a coating machine having a coating blade for applying a coating to a surface, an elongate, flexible backing bar to support the coating blade, and a plurality of actuators for applying distorting forces along the length of the backing bar, the improvement comprising:

a coupling member for joining the backing bar to one of the plurality of actuators, the coupling member comprising:

an elongate arm having ends adapted for connection to each of the backing bar and the one of the plurality of actuators;

a joint assembly intermediate the ends of the arm that divides the arm into first and second portions and permits independent pivotal movement of each portion; and locking means to lock the arm portions into position with respect to the joint assembly to create a rigid member having a generally longitudinal axis defined by the arm portions for transmission of forces along the longitudinal axis between the backing bar and the one of the plurality of actuators.

9. A coating machine as claimed in claim 8 in which the joint assembly comprises a pair of ball and socket joints.

10. A coating machine as claimed in claim 9 in which the ball and socket joints are formed from a main housing formed with sockets and a ball formed at the end of each arm portion adapted to be received in each socket.

11. A coating machine as claimed in claim 10 in which the main housing comprises a clamp member having upper and lower portions formed with alignable hemispherical cavities that co-operate to define the sockets.

12. A coating machine as claimed in claim 11 in which the locking means comprises a fastener connecting together the upper and lower portions of the clamp member in order to draw the portions together to grip the balls of the arm portions in the sockets to fix the arm portions with respect to the main housing.

13. A coating member as claimed in claim 12 in which the upper and lower portions of the clamping member are formed with an alignable threaded passage and the fastener is a threaded bolt tightenable into the threaded passage.

* * * * *